(12) United States Patent
Xu

(10) Patent No.: US 10,679,543 B2
(45) Date of Patent: Jun. 9, 2020

(54) IMAGE PROCESSING METHOD, IMAGE PROCESSING DEVICE AND DISPLAY PANEL

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventor: Yuanjie Xu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days.

(21) Appl. No.: 16/028,868

(22) Filed: Jul. 6, 2018

(65) Prior Publication Data
US 2019/0035321 A1    Jan. 31, 2019

(30) Foreign Application Priority Data
Jul. 25, 2017    (CN) .......................... 2017 1 0613092

(51) Int. Cl.
 *G09G 3/20*  (2006.01)
 *G09G 3/34*  (2006.01)
 (Continued)

(52) U.S. Cl.
 CPC ......... *G09G 3/2003* (2013.01); *G06F 3/0488* (2013.01); *G06T 11/001* (2013.01);
 (Continued)

(58) Field of Classification Search
CPC combination set(s) only.
See application file for complete search history.

(56) References Cited

U.S. PATENT DOCUMENTS

| 6,175,371 B1 | 1/2001 | Schoulz et al. |
| 2005/0156943 A1* | 7/2005 | Fujioka ................... G09G 5/02 345/589 |

(Continued)

FOREIGN PATENT DOCUMENTS

| CN | 102707510 A | 10/2012 |
| CN | 103561223 A | 2/2014 |

(Continued)

OTHER PUBLICATIONS

First Office Action dated May 20, 2019 corresponding to Chinese application No. 201710613092.4.

*Primary Examiner* — Wesner Sajous
(74) *Attorney, Agent, or Firm* — Nath, Goldberg & Meyer; Joshua B. Goldberg

(57) ABSTRACT

An image processing method for a transparent display screen, an image processing device and a display panel are provided. The image processing method comprising: collecting colors of image content displayed on the transparent display screen and colors of background transmitted through the transparent display screen; determining whether the collected colors of the background and the collected colors of the content are similar colors; and modifying the colors of the background or the colors of the content, if the collected colors of the background and the colors of the content are similar colors.

18 Claims, 5 Drawing Sheets

(51) Int. Cl.
  *G09G 5/00* (2006.01)
  *G06T 11/00* (2006.01)
  *G06F 3/048* (2013.01)
  *G06F 3/0488* (2013.01)
  *G06F 3/042* (2006.01)

(52) U.S. Cl.
  CPC .............. *G09G 3/3413* (2013.01); *G09G 5/00* (2013.01); *G06F 3/042* (2013.01); *G06T 2210/62* (2013.01); *G09G 2320/0666* (2013.01); *G09G 2340/10* (2013.01)

(56) References Cited

U.S. PATENT DOCUMENTS

| | | | |
|---|---|---|---|
| 2016/0240125 A1* | 8/2016 | Sridharan | G09G 5/02 |
| 2016/0351164 A1 | 12/2016 | Hsieh et al. | |
| 2017/0200424 A1* | 7/2017 | Xu | G09G 3/3225 |
| 2018/0203227 A1* | 7/2018 | Xu | G01J 3/462 |
| 2019/0094554 A1* | 3/2019 | Benesh | G02B 27/017 |

FOREIGN PATENT DOCUMENTS

| | | | |
|---|---|---|---|
| CN | 105206644 A | 12/2015 | |
| CN | 105451094 A | 3/2016 | |
| CN | 106101667 A | 11/2016 | |

* cited by examiner

IMAGE PROCESSING METHOD, IMAGE PROCESSING DEVICE AND DISPLAY PANEL

CROSS-REFERENCE TO RELATED APPLICATIONS

This application claims priority to Chinese Patent Application No. 201710613092.4 filed on Jul. 25, 2017, the content of which is incorporated herein by reference in its entirety.

TECHNICAL FIELD

The present disclosure relates to display technology, and in particular, to an image processing method, an image processing device and a display panel.

BACKGROUND

A transparent display means that an audience can see a content behind a display screen while seeing a content displayed on the display screen. The current transparent display technology includes transparent liquid crystal display, transparent liquid crystal projection, transparent OLED display and transparent LED display.

In current transparent display technology, the content displayed cannot be changed according to a background. Therefore, when colors of content displayed and colors of the background are the same color or similar colors, the content displayed cannot be seen clearly.

SUMMARY

The present disclosure provides an image processing method for a transparent display screen, including: collecting colors of image content displayed on the transparent display screen and colors of background transmitted through the transparent display screen; determining whether the collected colors of the background and the collected colors of the content are similar colors, wherein the similar colors are colors have difference in HSL color mode being less than 30%; and modifying the colors of the background or the colors of the content if the collected colors of the background and the colors of the content are similar colors.

According to one embodiment of the present disclosure, wherein determining whether the collected colors of the background and the collected colors of the content are similar colors includes: assigning, in a clockwise or a counterclockwise direction, each color on a hue ring to a value selecting from consecutive natural numbers starting from 1 in ascending order; assigning values to the colors of the background and the colors of the content on the transparent display screen according to the values of respective colors on the hue ring; and calculating a difference between the values of the colors of the background and the values of the colors of the content, wherein the colors of the background and the colors of the content are determined to be similar colors if the absolute value of a ratio of the difference and the assigned maximum value is not greater than 0.1.

According to one embodiment of the present disclosure, wherein assigning values to the colors of the background and the colors of the content on the transparent display screen according to the values of respective colors on the hue ring includes: comparing the colors of the background and the colors of the content with the colors on the hue ring, respectively; and assigning a value of a color on the hue ring to the colors of the background when a difference in HSL color mode between the colors of the background and the color on the hue ring is less than 10%, and assigning a value of a color on the hue ring to the colors of the content when a difference in HSL color mode between the colors of the content and the color on the hue ring is less than 10%.

According to one embodiment of the present disclosure, wherein modifying the colors of the content includes: modifying color of the overall content to its complementary color; or modifying color of an edge of the content to its complementary color.

According to one embodiment of the present disclosure, wherein a color and its complementary color has a 180° angle therebetween on the hue ring.

According to one embodiment of the present disclosure, wherein modifying the colors of the background includes: deposing an electrochromic film layer on one side of the transparent display screen, and modifying colors of a part of the electrochromic film layer corresponding to a area where the colors of the background need to be modified.

According to one embodiment of the present disclosure, wherein the transparent display screen further includes a touch-control layer, and modifying the colors of the background includes: emitting, by a part of the touch-control layer corresponding to an area where the colors of the background need to be modified, background lights of a specific color.

According to one embodiment of the present disclosure, wherein modifying the colors of the background includes: analyzing the displayed image content; obtaining a dominant color contained in the content; and selecting suitable background color according to the obtained color.

The present disclosure provides an image processing device for a transparent display screen, including: a collecting circuit configured to collect colors of image content displayed on the transparent display screen and colors of background transmitted through the transparent display screen; an analyzing circuit configured to determine whether the collected colors of the background and the collected colors of the content are similar colors, wherein the similar colors are colors have difference in HSL color mode being less than 30%; and a color modifying circuit configured to modify the colors of the background or the colors of the content if the collected colors of the background and the colors of the content are similar colors.

According to one embodiment of the present disclosure, wherein the analyzing circuit includes: a first assigning circuit configured to assign, in a clockwise or a counter-clockwise direction, each color on a hue ring to a value selecting from consecutive natural numbers starting from 1 in ascending order; a second assigning circuit configured to assign values to the colors of the background and the colors of the content on the transparent display screen according to the values of respective colors on the hue ring; and a calculating circuit configured to calculate a difference between the values of the colors of the background and the values of the colors of the content, wherein the colors of the background and the colors of the content are determined to be similar colors if the absolute value of a ratio of the difference and the assigned maximum value is not greater than 0.1.

According to one embodiment of the present disclosure, wherein the second assigning circuit includes: a comparing sub-circuit configured to compare the colors of the background and the colors of the content with the colors on the hue ring, respectively; and a determining sub-circuit configured to assign a value of a color on the hue ring to the colors of the background when a difference in HSL color mode between the colors of the background and the color on the hue ring is less than 10%, and assign a value of a color on the hue ring to the colors of the content when a difference in HSL color mode between the colors of the content and the color on the hue ring is less than 10%.

According to one embodiment of the present disclosure, wherein the color modifying circuit is configured to modify the colors of the content by: modifying color of the overall content to its complementary color; or modifying color of an edge of the content to its complementary color.

According to one embodiment of the present disclosure, wherein a color and its complementary color has a 180° angle therebetween on the hue ring.

According to one embodiment of the present disclosure, wherein an electrochromic film layer is deposed on one side of the transparent display screen, and wherein the color modifying circuit is configured to modify the colors of the background by: modifying colors of a part of the electrochromic film layer corresponding to a area where the colors of the background need to be modified.

According to one embodiment of the present disclosure, wherein the transparent display screen further comprises a touch-control layer, and the color modifying circuit is configured to modify the colors of the background by: emitting, by a part of the touch-control layer corresponding to an area where the colors of the background need to be modified, background lights of a specific color.

According to one embodiment of the present disclosure, wherein the color modifying circuit is configured to modify the colors of the background by: analyzing the displayed image content; obtaining a dominant color contained in the content; and selecting suitable background color according to the obtained color.

This disclosure provides a transparent display panel, including the image processing apparatus according to the embodiments above.

According to one embodiment of the present disclosure, the transparent display panel further including the transparent display substrate and an electrochromic film layer disposed on one side of the transparent display substrate, wherein the electrochromic film layer is divided into a plurality of regions, and each of the regions is connected to the color modifying circuit of the image processing device through a control signal line, and each of the regions is configured to modifying the colors of the background of the image according to a color modifying signal output by the color modifying circuit.

According to one embodiment of the present disclosure, wherein the electrochromic film layer is configured to perform touch-control on the display panel.

According to one embodiment of the present disclosure, wherein the color modifying circuit is configured to modify the colors of the content by: modifying color of the overall content to its complementary color; or modifying color of an edge of the content to its complementary color.

DETAILED DESCRIPTION

For ordinary transparent displays, colors of the background of the transparent display are usually set to white. In actual use, the colors of the background are not only complicated but also changes. Therefore, if the colors of the display content cannot be modified, it will be difficult for the transparent display screen to adapt to changes in the environment. For example, in a case where a transparent display screen is used in a conference room, used for outdoor displaying, or needs to be moved at any time (such as, used as a mobile advertising board), the environment may change frequently, therefore, the colors of the background may be different for different application scenarios, or the colors of the background may be different for the same application scenario.

Therefore, how to adapt the colors of the background and the colors of the content displayed on the transparent display screen, such that the content displayed can be clearly seen has become a problem that needs to be solved urgently.

The present disclosure will be further described below in conjunction with the drawings and detailed description, thus the technical solutions of the present disclosure can be understand better by one of ordinary skill in the art.

Figure 1:
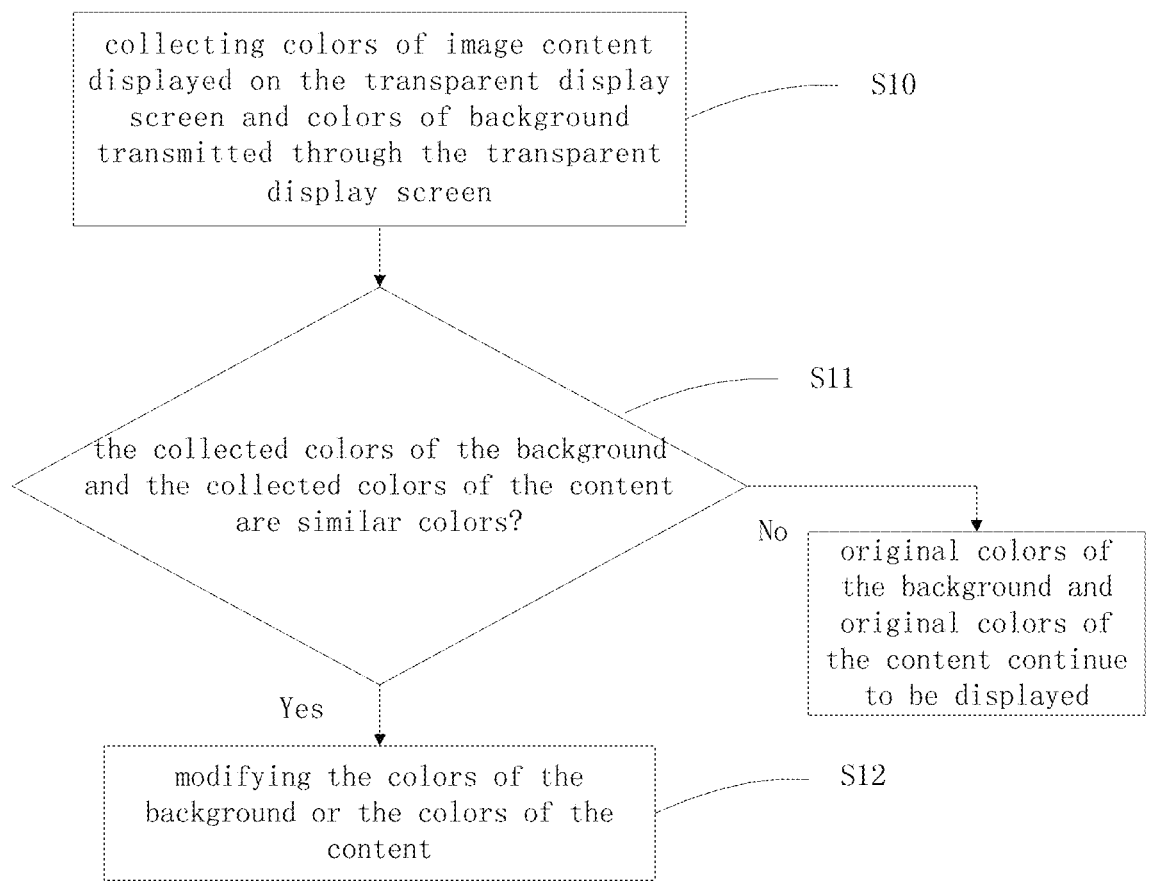
FIG. 1 is a flowchart of an image processing method according to an embodiment of the present disclosure.
Figure 2:
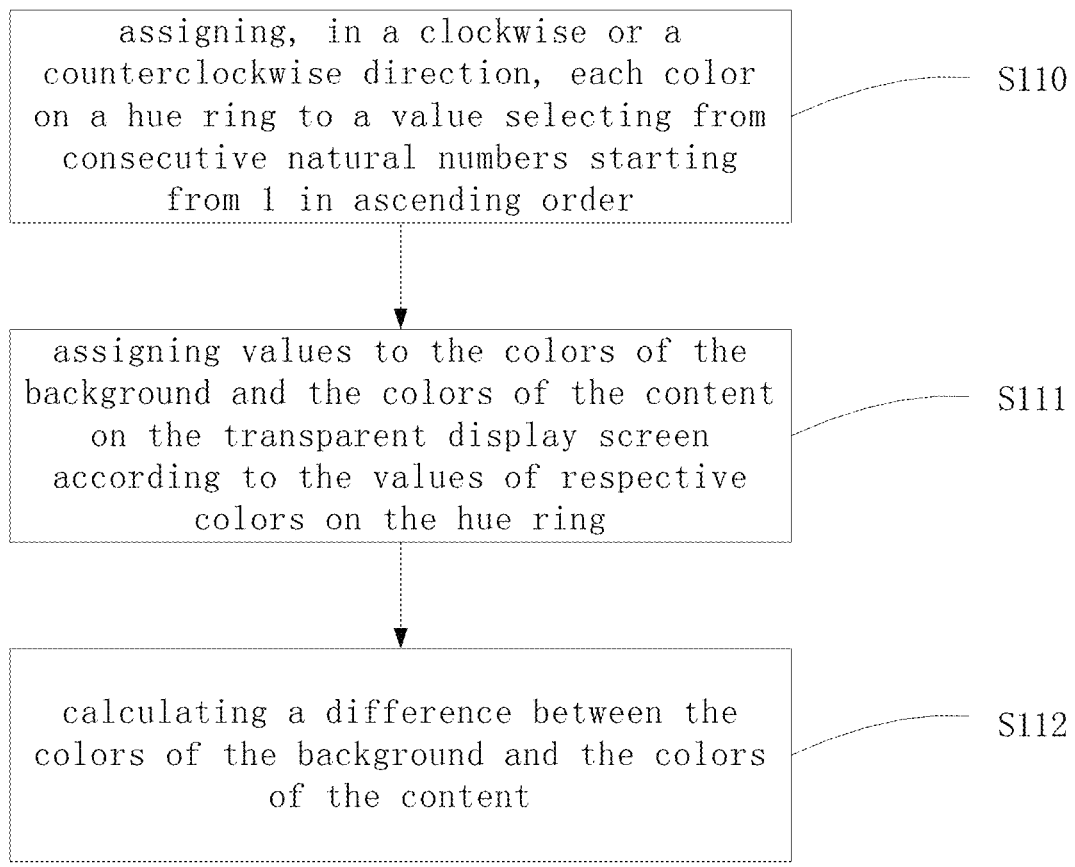
FIG. 2 is a flowchart of an image processing method according to another embodiment of the present disclosure.

This embodiment provides an image processing method for a transparent display screen. As shown in FIG. 1 and FIG. 2, the method includes steps S10-S12.

As step S10, collecting colors of image content displayed on the transparent display screen and colors of background transmitted through the transparent display screen.

At this step, the colors of the content of the image include the colors of text and the colors of pictures in the image. The colors of image content displayed and the colors of the background can be collected by cameras or optical sensors.

Step S11: determining whether the collected colors of the background and the collected colors of the content are similar colors, wherein the similar colors are colors have difference in HSL color mode being less than 30%.

In HSL color mode, various colors are obtained by changing the three color channels of hue (H), saturation (S), and lightness (L) and superimposing them with each other.

This step S11 specifically includes steps S110-S112, as shown in FIG. 2.

Figure 3:
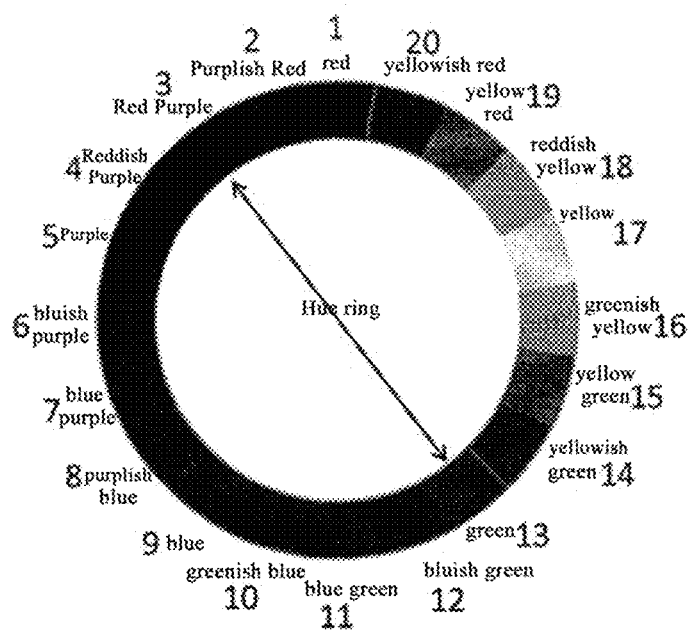
FIG. 3 is a diagram illustrating assigning values to colors on the hue ring.

At step S110, assigning, in a clockwise or a counterclockwise direction, each color on a hue ring to a value selecting from consecutive natural numbers starting from 1 (such as 1-20, as shown in FIG. 3) in ascending order.

At step S111, assigning values to the colors of the background and the colors of the content on the transparent display screen according to the values of respective colors on the hue ring.

The step S111 specifically includes: comparing the colors of the background and the colors of the content with the colors on the hue ring, respectively; and assigning a value of a color on the hue ring to the colors of the background when a difference in HSL color mode between the colors of the background and the color on the hue ring is less than 10%, and assigning a value of a color on the hue ring to the colors of the content when a difference in HSL color mode between the colors of the content and the color on the hue ring is less than 10%.

At step S112, calculating a difference between the values of the colors of the background and the values of the colors of the content. The colors of the background and the colors of the content are determined to be similar colors if the absolute value of a ratio of the difference and the assigned maximum value is not greater than 0.1.

It should be noted that, for example, as shown in FIG. 3, in a case where assigning, in a counterclockwise direction, values 1-20 to each color on the hue ring in ascending order, if the difference in HSL color mode between the colors of the content and the colors of the background is between −2 and 2, the absolute value of a ratio of the difference and the assigned maximum value 20 is not greater than 10%. In this case, the difference in HSL color mode between the colors of the content and the colors of the background should not greater than 10, if the difference greater than 10, an adjusted difference is calculated by subtracting the difference from the maximum 20. For example, the difference between the maximum value 20 and the minimum 1 is 19 and is greater than 10, however, the color of red (which is assigned as 1 in FIG. 3) and the color of yellow red (which is assigned as 20 in FIG. 3) are adjacent each other, the adjusted difference is calculated by subtracting the difference 19 from the maximum 20, i.e., the adjusted difference is 20−19=1, and the ratio of the adjusted difference and the maximum value 20 is 5%, which is less than 10%, it means that the color of red and the color of yellow red are similar colors.

Back to FIG. 2, if the result of step S11 is "Yes" (i.e., the collected colors of the background and the colors of the content are similar colors), a step S12 is performed. At step S12: modifying the colors of the background or the colors of the content. The colors of the background may be modified to its complementary color, or the colors of the content may be modified to its complementary color. For example, color of the overall content is modified to its complementary color, or color of an edge of the content is modified to its complementary color.

In addition, if the result of step S11 is "No" (i.e., the collected colors of the background and the colors of the content are not similar colors), the original colors of the background and the original colors of the content continue to be displayed.

According to one embodiment of the present disclosure, modifying the colors of the content to its complementary color includes: modifying color of the overall content to its complementary color; or modifying color of an edge of the content to its complementary color. Using either of these methods, an apparent contrast between the colors of the background and the colors of the content can be formed on the transparent display screen, and the color saturation of the image screen can be enhanced, so that the content in the image can be clearly seen.

Wherein, A color and its complementary color has a 180° angle therebetween on the hue ring. If two colors are mixed to form a neutral grey black, the two colors may be complementary colors relative to each other. When two complementary colors are arranged together, the color saturation of the picture could be enhanced, and a sense of beauty in the picture may arise.

Figure 5:
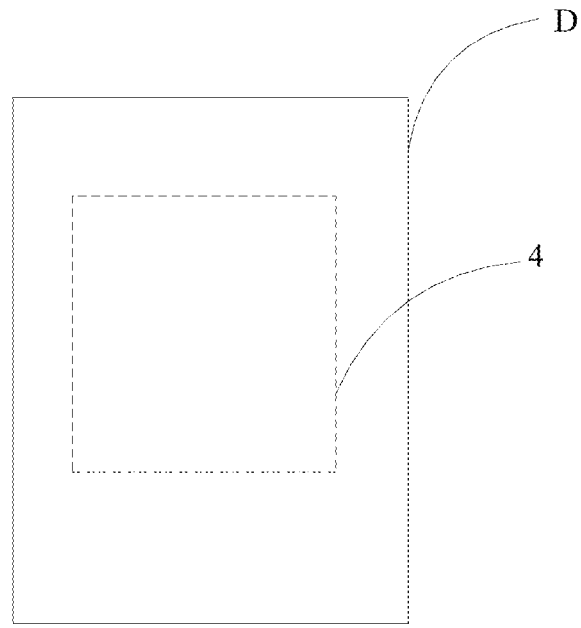
FIG. 5 is a block diagram of an image processing device according to another embodiment of the present disclosure.

According to an embodiment of the present disclosure, as shown in FIG. 5, modifying the colors of the background includes: deposing an electrochromic film layer 4 on one side of a transparent display screen D, and modifying colors of a part of the electrochromic film layer corresponding to a area where the colors of the background need to be modified. The electrochromic film may be formed of an electroluminescent material such as a quantum dot, an OLED, and the like. The electrochromic film may be divided into a plurality of regions, and each of the regions corresponds to a control line. When the background of the transparent display needs to be rendered, the image modification circuit sends a signal to the control line of the electrochromic film in the corresponding area, so that the color of the area changes.

Figure 6:
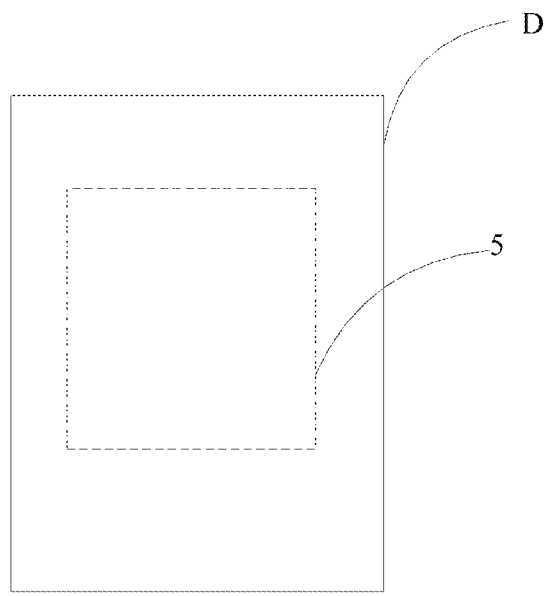
FIG. 6 is a block diagram of an image processing device according to another embodiment of the present disclosure.

According to an embodiment of the present disclosure, as shown in FIG. 6, the transparent display screen D further includes a touch-control layer 5, and modifying the colors of the background includes: emitting, by a part of the touch-control layer corresponding to an area where the colors of the background need to be modified, background lights of a specific color. Wherein, for the touch-control layer on the transparent display screen, the transparent display screen is partitioned according to the size of the touch layer pattern. Except to receive the touch control signal, the touch-control layer may also send a specific signal, and under control of the specific signal, the touch-control layer may emit background lights of a specific color, such as red, yellow, green, blue, and the like.

According to an embodiment of the present disclosure, modifying the colors of the background includes: analyzing the displayed image content; obtaining a dominant color contained in the content; and selecting suitable background colors according to the obtained color. Wherein, the transparent display screen can analyze the content files that need to be presented in advance, analyze the colors appearing more frequently in the text and the images, i.e., the dominant color contained in the content, and recommend the best background color by analyzing the colors. The user can select a suitable background color based on the recommended background color.

The image processing method in this embodiment can collect, analyze, and determine the colors of the background and the colors of the content, and modify one of the colors of the background and the colors of the content on the transparent display screen which are the similar colors to each other, such that the colors of the background and the colors of the content on the transparent display screen can be contrasted apparently, and the color saturation is visually enhanced, therefore the content in the image can be seen clearly and the displaying effect for images is improved, especially the displaying effect for images on the transparent display.

Figure 4:
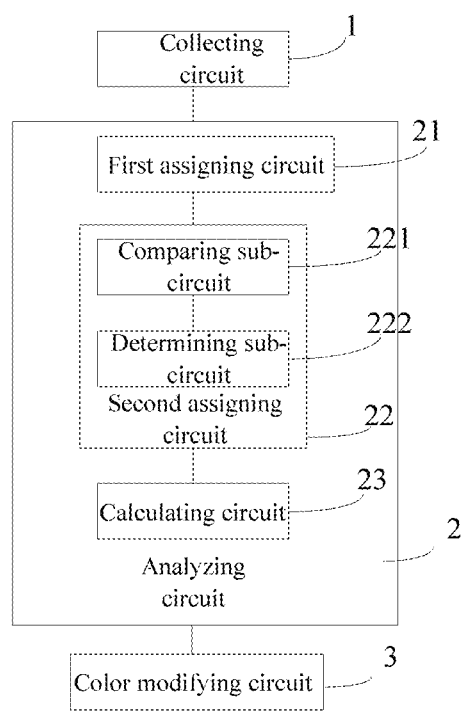
FIG. 4 is a block diagram of an image processing device according to an embodiment of the present disclosure.

Based on the aforementioned image processing method, this embodiment provides an image processing device for a transparent display screen. As shown in FIG. 4, the image processing device includes: a collecting circuit 1, configured to collect the colors of the image content displayed on the transparent display screen and the colors of the background transmitted through the transparent display screen; an analyzing circuit 2, configured to analyze the collected colors of the background and the collected colors of the content and determine whether they are similar colors, wherein the similar colors are colors with HSL color mode being less than 30% from each other, and a color modifying circuit 3, configured to modify the colors of the background or the colors of the content if the collected colors of the background and the colors of the content are the similar colors.

Wherein, a camera or an optical sensor can be used as the collecting circuit 1.

By configuring the collecting circuit 1, the analyzing circuit 2 and the color modifying circuit 3, the colors of the background and content color in the transparent display screen can be contrasted apparently, and the color saturation is visually enhanced, therefore the content in the image can be seen clearly and the displaying effect for images is improved, especially the displaying effect for images on the transparent display.

In the present embodiment, the analyzing circuit 2 includes: a first assigning circuit 21, configured to assign, in a clockwise or a counterclockwise direction, each color on the hue ring to a value selecting from consecutive natural numbers starting from one in ascending order; a second assigning circuit 22, configured to assign values to the colors of the background and the colors of the content on the transparent display screen respectively according to the values of respective colors on the hue ring; a calculating circuit 23, configured to calculate the difference between the values of the colors of the background and the values of the colors of the content, wherein the colors of the background and the colors of the content are determined to be similar colors if the absolute value of the ratio of the difference and the assigned maximum value is not greater than 0.1.

Wherein, the second assigning circuit 22 includes: a comparing sub-circuit 221, configured to compare the colors of the background and the colors of the content with the colors on the hue ring respectively; a determining sub-circuit 222, configured to assign values of colors on the hue ring to the colors of the background or the colors of the content, when the difference between the HSL color mode of the colors of the background and the HSL color mode of the color on the hue ring or the difference between the HSL color mode of the colors of the content and the HSL color mode of the color on the hue ring is less than 10%.

Wherein, the color modifying circuit 3 can modify the colors of the background or the colors of the content. Wherein, the colors of the background can be modified, and the colors of the content can also be modified to its complementary color. For example, the overall color of the content is modified to its complementary color; or the edge color of the content is modified to its complementary color.

According to an embodiment of this disclosure, wherein the color modifying circuit is configured to modify the colors of the content by: modifying the overall color of the content to its complementary color; or, modifying the edge color of the content to its complementary color.

Wherein, the complementary color of a color is a color with a 180° angle therebetween on the hue ring.

According to an embodiment of the present disclosure, as shown in FIG. 5, an electrochromic film layer 4 is deposed on one side of a transparent display screen D, and the color modifying circuit is configured to modify the colors of the background by: modifying the colors of the electrochromic film layer corresponding to a area where the colors of the background need to be modified. Wherein, the electrochromic film could be an electroluminescent material such as a quantum dot, an OLED, and the like. The electrochromic film may be divided into a plurality of regions, and each region corresponds to a control line. When the background of the transparent display needs to be rendered, the image modification circuit sends a signal to the control line of the electrochromic film in the corresponding area, such that the color of the area changes.

According to an embodiment of the present disclosure, as shown in FIG. 6, the transparent display screen D further includes a touch-control layer 5, and the color modifying circuit is configured to modify the colors of the background by: the touch-control layer corresponding to an area where the colors of the background need to be modified emitting background lights of a specific color. Wherein, for the touch-control layer on the transparent display screen, the transparent display screen is partitioned according to the size of the touch layer pattern. Except to receive the touch signal, the touch-control layer may also send a specific signal, and under control of the specific signal, the touch-control layer may emit background lights of a specific color, such as red, yellow, green, blue, and the like.

According to an embodiment of the present disclosure, the color modifying circuit is configured to modify the colors of the background by: analyzing the displayed image content in advance, obtaining the dominant colors contained in the content, and selecting suitable background colors according to the obtained colors. Wherein, the transparent display screen can analyze the content files that need to be presented in advance, analyze the colors appearing more frequently in the text and the images, and recommend the best background color by analyzing the colors. The user can select a suitable background color based on the recommended background color.

The image processing device for a transparent display screen provided in this embodiment may configure the collecting circuit, the analyzing circuit, and the color modifying circuit, such that the colors of the background and colors of the content on the transparent display screen can be contrasted apparently, and the color saturation is visually enhanced, therefore the content in the image can be seen clearly and the displaying effect for images is improved, especially the displaying effect for images on the transparent display.

Figure 7:
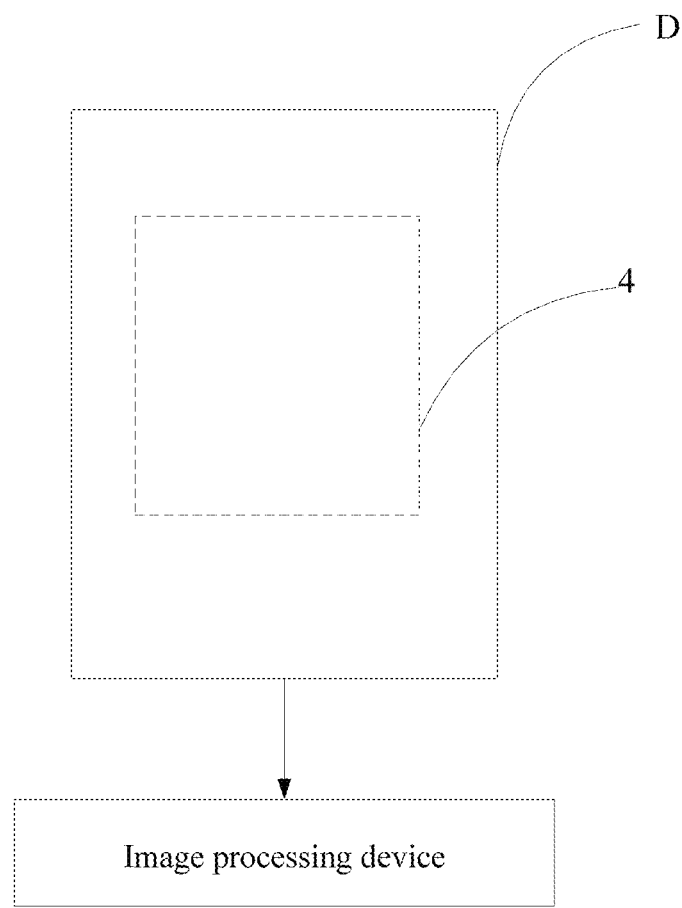
FIG. 7 is a block diagram of a transparent display panel according to an embodiment of the present disclosure.

As shown in FIG. 7, this embodiment provides a transparent display panel DP, which includes the aforementioned image processing device.

In this embodiment, the transparent display panel further includes a transparent display substrate and an electrochromic film layer disposed on one side of the transparent display substrate, wherein the electrochromic film layer is divided into a plurality of regions, each of the regions is connected to the color modifying circuit of the image processing device through a control signal line, and each of the regions is configured to modifying the colors of the background of the image according to a color modifying signal output by the color modifying circuit.

Wherein, the electrochromic film could be an electroluminescent material such as a quantum dot or an OLED. The electrochromic film is transparent and can transmit light normally when there is not an electric signals input for controlling its light emission. When an electric signal for controlling its light emission is input, the electrochromic film is lighted under the control of the electrical signal and displays a certain color, thereby realizing modification of the colors of the background of the transparent display panel.

In this embodiment, the electrochromic film layer is also configured to control the transparent display panel. That is, the electrochromic film layer can also be used as a touch-control layer of a display panel, in order to achieve control of the display panel.

The display panel in this embodiment uses the image processing device in above embodiments, such that the image displayed on the display panel can be more clear, thereby improving the display effect of the display panel.

The display panel provided by the present disclosure may be any products or components that with display function, such as an OLED panel, an OLED television, a liquid crystal panel, a liquid crystal television, an LED panel, an LED television, a display, a mobile phone, and a navigator.

The image processing device of the present disclosure may be implemented with one or more processors. The processor may be a general-purpose microprocessor, a microcontroller, a digital signal processor (DSP), an application specific integrated circuit (ASIC), a field programmable gate array (FPGA), a programmable logic device (PLD), or the like.

It can be understood that the above embodiments are merely exemplary embodiments used for illustrating the principle of the present disclosure; however, the disclosure is not limited thereto. For those skilled in the art, various modifications and improvements may be made without departing from the spirit and essence of the present disclosure, and these variations and improvements are also considered as the protection scope of the present disclosure.

What is claimed is:

1. An image processing method for a transparent display screen, comprising:
   collecting colors of image content displayed on the transparent display screen and colors of background transmitted through the transparent display screen;
   determining whether the collected colors of the background and the collected colors of the content are similar colors, wherein the similar colors are colors having difference in HSL color mode being less than 30%; and
   modifying the colors of the background or the colors of the content if the collected colors of the background and the colors of the content are similar colors.

2. The image processing method according to claim 1, wherein determining whether the collected colors of the background and the collected colors of the content are similar colors comprises:
   assigning, in a clockwise or a counterclockwise direction, each color on a hue ring to a value selecting from consecutive natural numbers starting from 1 in ascending order;
   assigning values to the colors of the background and the colors of the content on the transparent display screen according to the values of respective colors on the hue ring; and
   calculating a difference between the values of the colors of the background and the values of the colors of the content, wherein the colors of the background and the colors of the content are determined to be similar colors if the absolute value of a ratio of the difference and the assigned maximum value is not greater than 0.1.

3. The image processing method according to claim 2, wherein assigning values to the colors of the background and the colors of the content on the transparent display screen according to the values of respective colors on the hue ring comprises:
   comparing the colors of the background and the colors of the content with the colors on the hue ring, respectively; and
   assigning a value of a color on the hue ring to the colors of the background when a difference in HSL color mode between the colors of the background and the color on the hue ring is less than 10%, and assigning a value of a color on the hue ring to the colors of the content when a difference in HSL color mode between the colors of the content and the color on the hue ring is less than 10%.

4. The image processing method according to claim 1, wherein modifying the colors of the content comprises:
   modifying color of the overall content to its complementary color; or
   modifying color of an edge of the content to its complementary color.

5. The image processing method according to claim 4, wherein a color and its complementary color has a 180° angle therebetween on the hue ring.

6. The image processing method according to claim 1, wherein modifying the colors of the background comprises:
   deposing an electrochromic film layer on one side of the transparent display screen, and
   modifying colors of a part of the electrochromic film layer corresponding to a area where the colors of the background need to be modified.

7. The image processing method according to claim 1, wherein modifying the colors of the background comprises:
   analyzing the displayed image content;
   obtaining a dominant color contained in the content; and
   selecting suitable background color according to the obtained color.

8. An image processing device for a transparent display screen comprising:
   a collecting circuit configured to collect colors of image content displayed on the transparent display screen and colors of background transmitted through the transparent display screen;
   an analyzing circuit configured to determine whether the collected colors of the background and the collected colors of the content are similar colors, wherein the similar colors are colors having difference in HSL color mode being less than 30%; and
   a color modifying circuit configured to modify the colors of the background or the colors of the content if the collected colors of the background and the colors of the content are similar colors.

9. The image processing device according to claim 8, wherein the analyzing circuit comprises:
   a first assigning circuit configured to assign, in a clockwise or a counterclockwise direction, each color on a hue ring to a value selecting from consecutive natural numbers starting from 1 in ascending order;
   a second assigning circuit configured to assign values to the colors of the background and the colors of the content on the transparent display screen according to the values of respective colors on the hue ring; and
   a calculating circuit configured to calculate a difference between the values of the colors of the background and the values of the colors of the content, wherein the colors of the background and the colors of the content are determined to be similar colors if the absolute value of a ratio of the difference and the assigned maximum value is not greater than 0.1.

10. The image processing device according to claim 9, wherein the second assigning circuit comprises:
    a comparing sub-circuit configured to compare the colors of the background and the colors of the content with the colors on the hue ring, respectively; and
    a determining sub-circuit configured to assign a value of a color on the hue ring to the colors of the background when a difference in HSL color mode between the colors of the background and the color on the hue ring is less than 10%, and assign a value of a color on the hue ring to the colors of the content when a difference in HSL color mode between the colors of the content and the color on the hue ring is less than 10%.

11. The image processing device according to claim 8, wherein the color modifying circuit is configured to modify the colors of the content by:
    modifying color of the overall content to its complementary color; or modifying color of an edge of the content to its complementary color.

12. The image processing device according to claim 11, wherein a color and its complementary color has a 180° angle therebetween on the hue ring.

13. The image processing device according to claim 8, wherein an electrochromic film layer is deposed on one side of the transparent display screen, and wherein the color modifying circuit is configured to modify the colors of the background by: modifying colors of a part of the electrochromic film layer corresponding to a area where the colors of the background need to be modified.

14. The image processing device according to claim 8, wherein the color modifying circuit is configured to modify the colors of the background by:
analyzing the displayed image content;
obtaining a dominant color contained in the content; and
selecting suitable background color according to the obtained color.

15. A transparent display panel, comprising the image processing device of claim 8.

16. The transparent display panel according to claim 15, further comprising the transparent display substrate and an electrochromic film layer disposed on one side of the transparent display substrate,
wherein the electrochromic film layer is divided into a plurality of regions, and each of the regions is connected to the color modifying circuit of the image processing device through a control signal line, and
each of the regions is configured to modifying the colors of the background of the image according to a color modifying signal output by the color modifying circuit.

17. The display panel of claim 16, wherein the electrochromic film layer is configured to perform touch-control on the display panel.

18. The display panel of claim 15, wherein the color modifying circuit is configured to modify the colors of the content by:
modifying color of the overall content to its complementary color; or
modifying color of an edge of the content to its complementary color.

* * * * *